, 
United States Patent [19]

Serratelli et al.

[11] Patent Number: 4,574,137

[45] Date of Patent: Mar. 4, 1986

[54] PROCESS FOR PREPARING COPOLYMER POLYOLS

[75] Inventors: John F. Serratelli, Lake Jackson; Michael A. Norton, Friendswood, both of Tex.

[73] Assignee: The Dow Chemical Company, Midland, Mich.

[21] Appl. No.: 643,517

[22] Filed: Aug. 23, 1984

[51] Int. Cl.$^4$ .................. C08F 216/02; C08F 216/14; C08F 220/26; C08F 2/42

[52] U.S. Cl. ................................ 524/724; 524/710; 524/729; 524/732; 524/750; 524/760; 524/762; 524/765; 521/137; 526/238; 525/127; 525/131

[58] Field of Search .................. 526/238; 521/137; 524/762, 724, 710, 732, 729, 750, 760, 765

[56] References Cited

U.S. PATENT DOCUMENTS

| Re. 29,014 | 10/1976 | Pizzini | 524/750 |
|---|---|---|---|
| 3,383,351 | 5/1968 | Stamberger | 524/762 |
| 4,093,753 | 6/1978 | Ramlow | 521/137 |
| 4,104,236 | 8/1978 | Simroth | 521/137 |
| 4,119,586 | 10/1978 | Shah | 521/137 |
| 4,230,823 | 10/1980 | Alberts | 521/137 |
| 4,272,619 | 6/1981 | Balle | 521/137 |
| 4,390,645 | 6/1983 | Hoffman | 524/762 |
| 4,431,754 | 2/1984 | Hoffman | 524/762 |
| 4,448,903 | 5/1984 | Liang | 521/137 |
| 4,463,107 | 7/1984 | Simroth | 524/760 |
| 4,503,207 | 3/1985 | Neyman | 524/760 |
| 4,522,976 | 6/1985 | Grace | 524/724 |

FOREIGN PATENT DOCUMENTS 091036 10/1983 European Pat. Off. .

Primary Examiner—C. Warren Ivy
Attorney, Agent, or Firm—Gary C. Cohn

[57] ABSTRACT

Copolymer polyols are prepared by polymerizing an ethylenically unsaturated monomer in a polyahl mixture in the presence of iodine or an iodine-releasing inorganic compound. The use of the iodine or iodine-releasing inorganic compound provides a lower viscosity, more stable copolymer polyahl.

14 Claims, No Drawings

PROCESS FOR PREPARING COPOLYMER POLYOLS

BACKGROUND OF THE INVENTION

This invention relates to a graft polymer dispersion prepared by the polymerization of an ethylenically unsaturated monomer or mixtures thereof in a polyahl (hereinafter "polymer polyahl" or "copolymer polyahl"). More particularly, the invention relates to an improved process for preparing said copolymer polyahl, and an improved copolymer polyahl prepared thereby.

In recent years it has been known to prepare polymer dispersions in a polyahl mixture. In suoh dispersions, a polymer of an ethylenically unsaturated monomer or mixture of monomers is dispersed in a polyahl or mixture thereof. The dispersed polymer is normally grafted to the polyahl through some unsaturation in the polyahl. Such unsaturation is commonly introduced into the polyol by reaction thereof with a small amount of an unsaturated acid, such a fumaric or maleic acid or their anhydrides, or more recently, isocyanatoethylmethacrylate (IEM). In these copolymer polyahls, the polyahl makes up a continuous phase into which the copolymer is dispersed as a plurality of small particles.

These copolymer polyahls have found great utility in the production of diverse polyurethanes. In particular, the use of copolymer polyahls in preparing polyurethanes has been found to improve the processability of the polyurethane, as well as physical properties such as load bearing or modulus. It is often desirable to provide a copolymer polyahl with as high a dispersed phase content as possible. However, it has heretofore been difficult to prepare and/or use copolymer polyahl containing more than about 35–40 percent by weight dispersed phase. A high concentration of dispersed phase greatly increases the viscosity of the copolymer polyahl. When the viscosity exceeds about 6500 cps, it is usually too viscous to be pumped using conventional urethane molding and/or foaming equipment. With conventional copolymer polyahl, a viscosity of 6500 cps is usually reached at a dispersed phase concentration of 35–40 percent or lower. Even at a lower dispersed phase concentration, it is normally preferred to have a viscosity as low as possible to ease the handling of the copolymer polyahl.

Another problem associated with high dispersed phase concentration is that the stability of the dispersed phase is greatly reduced as the dispersed phase concentration exceeds about 35–40 percent. At higher dispersed phase concentration (higher solids), the copolymer particles tend to coalesce and phase separate. The phase separation of the copolymer greatly impares the utility of the copolymer polyahl and polyurethane prepared therewith.

Yet another common disadvantage of conventional copolymer polyahls is that in order to provide a stable copolymer dispersion one must introduce substantial amounts of unsaturation into the polyahl through which to graft the dispersed phase. It is generally easier and cheaper to prepare copolymer polyahl having a lesser amount of unsaturation in the polyahl.

It is known to prepare copolymer polyahls by polymerizing ethylenically unsaturated monomers in the presence of the polyahl and a chain transfer agent. The chain transfer agent is used in the preparation of copolymer polyahls in a manner analogous to the use thereof in conventional polymerizations, that is, to control the molecular weight distribution of the polymer. However, the choice of chain transfer agent has not heretofore been attributed to significant improvements in the properties of the copolymer polyahl. In addition, the use of iodine ($I_2$) in making copolymer polyahls has not heretofore been known.

In view of the aforementioned deficiencies of previously known copolymer polyahls, it would be desirable to provide a copolymer polyahl that exhibits high stability and an acceptable viscosity of a high solids content or a lower viscosity at an equivalent solids content, than that exhibited by a conventional copolymer polyahl.

SUMMARY OF THE INVENTION

In one aspect, this invention is an improvement in a process for preparing a polymer polyahl. In the polymerization of an ethylenically unsaturated monomer or mixture thereof in the presence of a polyahl or mixture of polyahls whereby a dispersion of polymer particles is prepared in a continuous polyahl phase, the improvement of this invention comprises conducting said polymerization in the presence of a halogen, interhalogen (mixed halogen) or an iodine-releasing inorganic compound.

In another aspect, this invention is a copolymer polyahl prepared according to the improved process of this invention.

In yet another aspect, this invention is a polyurethane or polyurea foam prepared by reacting a reaction mixture comprising the copolymer polyahl of the invention and a polyisocyanate or polyisothiocyanate.

With the process of this invention, it is possible to prepare copolymer polyahls having a solids content up to 50 percent or more, and which have viscosities such that they are processable using conventional polyurethane molding and/or foaming equipment. At a given dispersed phase content, these have a lower viscosity than like copolymer polyahls prepared in the absence of the iodine or iodine-releasing inorganic compound. Moreover, the copolymer polyahl prepared according to this invention exhibits greater stability, i.e., a smaller tendency for the dispersed particles to agglomerate, than conventionally prepared copolymer polyahl and exhibits good flame retardant properties.

DETAILED DESCRIPTION OF THE INVENTION

In this invention, the polymerization of the monomers(s) in a continuous polyahl phase is conducted in the presence of a halogen interhalogen or iodine-releasing inorganic compound.

The halogen employed herein is chlorine, bromine, or iodine. Of these chlorine is least preferred due to more ionic character. Iodine is by far the most preferred halogen, because it provides a stable low viscosity copolymer polyol even when employed in small amounts.

Interhalogens employed herein are diatomic molecules wherein each atom is different and is selected from chlorine, bromine or iodine. Preferably, one of the atoms is iodine. Bromine iodide, i.e. IBr, is the most preferred of the interhalogens.

The iodine releasing inorganic compound useful herein is one which releases iodine, i.e. $I_2$, or iodine radicals, i.e. I., under the conditions of the polymerization of the monomers. Said iodine releasing inorganic compound contains at least one iodine atom bonded to a central atom other than carbon. Said central atom is preferably bonded to at least two, more preferably at least 3 iodine atoms. Said central atom may also be bonded to other atoms or groups such as inertly substituted hydrocarbyl, alkoxyl, hydrogen, halogen, and the like. Even though the iodine-releasing inorganic compound may have carbon-containing substituent groups, it is considered "inorganic" for the purposes of the invention if it contains iodine atoms which are attached to an atom other than carbon.

Suitable iodine-releasing inorganic compounds include, for example, $AsI_3$, $AuI_3$, $BI_3$, $DyI_3$, $ErI_3$, $GaI_3$, $GdI_3$, $GeI_3$, $HfI_3$, $K_2HgI_4InI_3$, $KAuI_4$, $PI_5$, $PI_3$, $K_2PtI_6$, $Na_2PtI_6$, $PtI_6$, $NdI_3$, $P_2I_4$, $PtI_4$, $RhI_3$, $RuI_3$, $SbI_3$, $SiI_4$, $TaI_5$, $TeI_4$, $TiI_4$, $ZrI_4$, $BaI_2$, $CdI_2$, $CoI_2$, $FeI_2$, $GeI_2$, $HgI_2$, $H_2I_2$, $MnI_2$, $MoI_2$, $PbI_2$, $PdI_2$, $PtI_2$, $SnI_2$, $SrI_2$, $WI_2$ and the like.

Also suitable are iodine-containing organometal compounds such as triphenyl antimony diiodide, $PC_{12}H_{36}Ag_4I_4$, dibutyltin diiodide, and the like.

The halogen, interhalogen or iodine-releasing inorganic compound (sometimes referred to herein as "reaction modifier") is employed in an amount sufficient to provide improved stability to the copolymer polyol of this invention. However, certain reaction modifiers can adversely affect the polymerization of the monomers if present in too high a concentration. Generally, the reaction modifier is employed in an amount typical for chain transfer agents, i.e. from about 0.05–3, preferably 0.2–1.0 percent by weight of the monomers to be polymerized. The halogen, interhalogen or iodine-releasing compound may be added batchwise to the polyahl of the beginning of the polymerization of the ethylenically unsaturated monomer. However, if present in too great a concentration, the halogen, interhalogen or iodine-releasing compound may inhibit the polymerization reaction. Thus, it may be desirable to add the halogen, interhalogen or iodine-releasing compound incrementally or continuously during the polymerization reaction in order to maintain optimum amount, thereof at all times during the reaction.

In the process of this invention, one or more ethylenically unsaturated monomers are polymerized in a polyahl or polyahl mixture. The polyahl or polyahl mixture normally and preferably contains a quantity of graft polymerization sites.

The term "polyahl" as used herein, includes any polyfunctional compound having at least two active hydrogen atoms. For the purposes of this invention, an active hydrogen moiety refers to a moiety containing a hydrogen atom which, because of its position in the molecule, displays significant activity according to the Zerewitnoff test described by Woller in the *Journal of American Chemical Society*, Vol. 49, page 3181 (1927). Illustrative of such active hydrogen moieties are —COOH, —OH, —NH₂, —NH—, —CONH₂, —SH and —CONH—. Typical polyahls include polyols, polyamines, polyamides, polymercaptans and polyacids.

Of the foregoing polyahls, the polyols are preferred. Examples of such polyols are the polyol polyethers, the polyol polyesters, hydroxy functional acrylic polymers, hydroxyl-containing epoxy resins, polyhydroxy terminated polyurethane polymers, polyhydroxyl-containing phosphorus compounds and alkylene oxide adducts of polyhydric thioethers including polythioethers, acetals including polyacetals, polyalkylene carbonate polyols, aliphatic and aromatic polyols and thiols including polythiols, ammonia and amines including aromatic, aliphatic and heterocyclic amines including polyamines as well as mixtures thereof. Alkylene oxide adducts of compounds which contain two or more different groups within the above-defined classes may also be used such as amino alcohols which contain an amino group and a hydroxyl group. Also, alkylene adducts of compounds which contain one —SH group and one —OH group as well as those which contain an amino group and a —SH group may be used.

Polyether polyols which are most advantageously employed as the polyahl in the practice of this invention are the polyalkylene polyether polyols including the polymerization products of alkylene oxides and other oxiranes with water or polyhydric alcohols having from two to eight hydroxyl groups. Exemplary alcohols that are advantageously employed in making the polyether polyol include ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerol, 1,1,1-trimethylolpropane, 1,1,1-trimethylolethane, hexane-1,2,6-triol, α-methyl glucoside, pentaerythritol, erythritol, pentatols and hexatols. Also included within the term "polyhydric alcohol" are sugars such as glucose, sucrose, frutose and maltose as well as compounds derived from phenols such a 2,2-(4,4'-hydroxyphenyl)propane, commonly known as bisphenol A. Illustrative oxiranes that are advantageously employed in the preparation of the polyether polyol include simple alkylene oxides such as ethylene oxide, propylene oxide, butylene oxide, and amylene oxide; glycidyl ethers such as t-butyl glycidyl ether and phenyl glycidyl ether; and random or block copolymers of two or more of these oxiranes. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have primary, secondary or tertiary hydroxyl groups and, preferably, are polyethers prepared from alkylene oxides having from two to six carbon atoms such as ethylene oxide, propylene oxide and butylene oxide. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951), or in U.S. Pat. No. 1,922,459. Also suitable are polyether polyols and processes for preparing them that are described in Schick, M. J., *Nonionic Surfactants*, Marcel Dekker, Inc., New York (1967), U.S. Pat. Nos. 2,891,073; 3,058,921; 2,871,219 and British Pat. No. 898,306. Polyether polyols which are most preferred include the alkylene oxide addition products of water, trimethylolpropane, glycerine, pentaerythritol, sucrose, sorbitol, propylene glycol and blends thereof having hydroxyl equivalent weights of from about 25 to about 5000.

Polyhydric thioethers which are sometimes advantageously condensed with alkylene oxides include the reaction product of thiodiglycol with alkylene oxides or dihydric alcohols such as disclosed above.

Polyhydroxyl-containing phosphorus compounds which are optionally used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Polyacetals (acetal resins) which are optionally reacted with alkylene oxides or other oxiranes include the reaction product of formaldehyde or other suitable aldehyde with a polyhydric alcohol or an oxirane such as those disclosed above. Polyacetals derived from acetone or from cyclic acetals are also suitably employed.

Aliphatic and aromatic thiols which are optionally reacted with alkylene oxides and other oxiranes include alkane thiols such as 1,2-ethane dithiol, 1,2-propane dithiol and 1,6-hexane dithiol; alkene thiols such as 2-butene-1,4-dithiol; and alkyne thiols such as 3-hexyne-1,6-dithiol; and arene thiols such as 1,4-benzene dithiol. Other thiols suitable for this purpose are hydrogen sulfide as well as thiol functional polymers such as polyvinylbenzyl thiol.

Acids and amides which are optionally reacted with alkylene oxides and other oxiranes include difunctional fatty acids such as hydroxystearic and dihydroxystearic acid as well as amides such as fatty acid alkanol amides, e.g., lauroyl monoethanolamide; diacids such as adipic and terephthalic acid; sulfonamides and other acids and amides set forth in Schick, supra.

Amines which are optionally reacted with alkylene oxides and other oxiranes include aromatic amines such as aniline, o-chloroaniline, p-amino aniline, 1,5-diamino naphthalene, methylene dianiline, the condensation products of aniline and formaldehyde and 2,4-diamino toluene; aliphatic amines such as methylamine, triisopropanolamine, isopropanolamine, diisopropanolamine, ethylenediamine, 1,3-propylenediamine, 1,4-butylenediamine and 1,3-butylenediamine, mixtures thereof and the like.

Additional polyethers and methods for their preparation are set forth in Schick, supra.

Examples of suitable hydroxy-containing polyesters include those obtained from polycarboxylic acids and polyhydric alcohols. Examples of suitable polycarboxylic acids include oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, $\alpha$-hydromuconic acid, $\beta$-hydromuconic acid, abutyl-a-ethyl-glutaric acid, $\alpha,\beta$-diethylsuccinic acid, isophthalic acid, terphthalic acid, hemimellitic acid, and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, a-methyl glucoside, pentaerythritol and sorbitol. Also included with the term "polyhydric alcohol" are compounds derived from phenols such as 2,2(4,4'-hydroxyphenyl)propane, commonly known as bisphenol A, bis(4,4'-hydroxyphenyl)sulfide and bis(4,4'-hydroxyphenyl)sulfone.

Other polyahls suitably employed include polylactones; hydroxy functional acrylic polymers such as polymers of hydroxyethyl acrylate and hydroxypropyl acrylate; polyvinyl acetate and other polymers of vinyl acetate and other ethylenically unsaturated carboxylic acids; hydroxyl-containing epoxy resins, urea-formaldehyde and melamine-formaldehyde resins; hydroxyl-containing polycarbonates and polyurethanes; methylol resins; starches and other cellulosic polymers; esters of phosphonic, sulfonic, sulfuric and boric acid; and polypeptides.

The polyahl or polyahl mixture normally and preferably contains a proportion of graft polymerization sites. The polyahl or polyahl mixture may contain a single polyahl species, a portion of which contains graft polymerization sites. Alternatively, the polyahl may be a mixture of two or more polyahl species, of which at least one contains graft polymerization sites.

The graft polymerization sites are any functional groups on the polyahl through which the polymer of the ethylenically unsaturated monomer or monomer mixture becomes grafted to the polyahl. Generally, the graft polymerization sites are carbon-carbon double bonds which are copolymerizable with the ethylenically unsaturated monomer or monomer mixture.

Said graft polymerization sites may be formed in side reactions which occur in the preparation of the polyahl, such as the unsaturated sites commonly formed in preparing a poly(propylene oxide) polyether polyol. Such normally occuring graft polymerization sites are most commonly adequate when the monomers being polymerized comprise a major portion of acrylonitrile.

More commonly, however, the graft polymerization sites are purposefully introduced into the polyahl or polyahl mixture.

The graft polymerization site is advantageously-introduced into the polyahl or polyahl mixture by reacting said polyahl or polyahl mixture or a component or portion thereof with a difunctional compound having an additional polymerizable ethylenically unsaturated group, especially vinyl group, i.e., —CHR'=CHR', wherein each R' is independently hydrocarbyl, preferably lower alkyl or hydrogen, and another functional group which reacts with polyahl to form a bond between the difunctional compound and the polyahl. Suitable such functional groups include, for example, carboxylic acid or anhydride, hydroxyl, epoxy and isocyanate groups. Preferably, the functional group is carboxylic acid or isocyanate.

Suitable difunctional compounds include ethylenically unsaturated carboxylic acids such as arcylic acid, methacrylic acid, furmaric acid, maleic acid, itaconic acid and the like. The preparation of such adducts are described for example, in European Patent Application No. 0091036. Also preferred are ethylenically unsaturated isocyanates, in particular isocyanatoalkyl esters of an ethylenically unsaturated carboxylic acid. Suitable such isocyanates include the isocyanatoalkyl esters of acrylic or methacrylic acid, $\alpha,\beta$-ethylenically unsaturated isocyanates, monovinylidene aryl isocyanates and monovinylidene arylmethyl isocyanates.

Exemplary isocyanatoalkyl esters include 2-isocyanatoethyl methacrylate, 2-isocyanoethyl acrylate, 3-isocyanatopropyl methacrylate, 1-methyl-2-isocyanatoethyl methacrylate and 1,1-dimethyl-2-isocyanatoethyl acrylate with 2-isocyanatoethyl methacrylate being most preferred. Suitable methods of preparing said isocyanato esters are well known, e.g. as shown in U.S. Pat. Nos. 2,718,516 and 2,821,544 and British Pat. No. 1,252,099. Exemplary monovinylidene aromatic isocyanates and monovinylidene arylmethyl isocyanates include styrene isocyanate and vinylbenzyl isocyanate. Exemplary $\alpha,\beta$-ethylenically unsaturated isocyanates include vinyl isocyanate and isopropenyl isocyanate. Isocyanatoethyl methacrylate is especially preferred. The preparation of adducts of a mono- or polyahl with such ethylenically unsaturated isocyanates is described, for example, in U.S. Pat. Nos. 4,390,645 and 4,394,491.

An ethylenically unsaturated monomer or mixture of monomers are polymerized in the polyahl or polyahl mixture in the presence of the aforementioned iodine or iodine-releasing inorganic compound. Suitable ethylenically unsaturated monomers include aliphatic conjugated dienes such as butadiene and isoprene; monovinylidene aromatic monomers such as styrene, α-methyl styrene, ar-methyl styrene, ar-(t-butyl)styrene, ar-chlorostyrene, ar-cyanostyrene and ar-bromostyrene; α,β-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)acrylamide, and the like; vinyl esters such as vinyl acetate; vinyl ethers; vinyl ketones; vinyl and vinylidene halides as well as a wide variety of other ethylenically unsaturated materials which are copolymerizable with the aforementioned adduct, many of which have heretofore been employed in the formation of copolymer polyols as described in U.S. Pat. Nos. 3,823,201 and 3,383,351. It is understood that mixtures of two or more of the aforementioned monomers are also suitably employed in making the copolymer. Of the foregoing monomers, the monovinylidene aromatic monomers, particularly styrene, and the ethylenically unsaturated nitriles, particularly acrylonitrile, are especially preferred.

The amount of ethylenically unsaturated monomer(s) employed in the copolymerization reaction is generally an amount sufficient to provide good reinforcement in urethane polymers and cell openings in urethane foams. Preferably, the amount of unsaturated monomer(s) is from about 1 to about 70, more preferably from about 5 to about 60, most preferably from about 10 to about 55, weight percent based on the weight of the copolymer dispersion. The amount of the graft polymerization sites employed in the polyahl or polyahl mixture is an amount sufficient to produce a stable dispersion and provide particle size control. Preferably, the amount of the adduct employed is sufficient to provide from about 0.0002 to about 1, more preferably from about 0.005 to about 0.5, most preferably from about 0.02 to about 0.5 moles of graft polymerization sites per mole of polyahl or polyahl mixture.

The copolymerization is readily carried out by simultaneously adding a monomer(s) and a free radical catalyst to the polyahl or polyahl mixture in the presence of the reaction modifier under conditions sufficient to cause free radical addition polymerization. The temperature of the copolymerization is dependent upon the initiator and is preferably in the range from about 25° to about 180° C., most preferably from about 110° to about 140° C., when azo-type catalysts are used. Alternatively, the free radical catalyst may be dispersed in a portion of the polyahl and thereafter added along with the monomer to the remaining portion of the polyahl or polyahl mixture. Other polymerization processes, both continuous and batch, may be suitably employed.

Suitably, the concentration of polymerization catalyst is any amount sufficient to cause copolymerization of the graft polymerization sites in the polyahl or polyahl mixture if any, and the ethylenically unsaturated monomer(s). Preferably, however, the concentration of catalyst is in the range from about 0.1 to about 20, more preferably from about 0.5 to about 5, weight percent based on the combined weight of the mono-adduct and other monomer(s).

Catalysts suitably employed in the practice of the copolymerization are free radical type polymerization catalysts such as the peroxides, persulfates, perborates, percarbonates, azo compounds and the like. Examples of such catalysts include hydrogen peroxide, t-butyl peroxide, di(t-butyl)peroxide, t-butyl peroctoate, lauroyl peroxide, cumene hydroperoxide, t-butyl hydroperoxide, azobis(isobutyronitrile) as well as mixtures of such catalysts. Of the foregoing catalysts, the azo catalysts particularly azobis(isobutyronitrile) and azobis(methylbutyronitrile) are preferred.

The resulting copolymer polyol is generally more stable and less viscous than a like copolymer polyol prepared in the absence of the halogen, interhalogen or iodine-releasing inorganic compound used herein. Accordingly, copolymer polyahls having a higher solids content can be prepared at any given viscosity according to this invention than according to conventional processes.

Further reduction in viscosity can be achieved by diluting the copolymer polyahl with an additional polyahl (which may be the same or different from that used in preparing the copolymer polyahl) to obtain a lower solids blend. The lower solids blend normally exhibits a lower viscosity than that exhibited by a similar copolymer polyahl prepared directly with the same solids content. For example, a 50% solids copolymer polyahl prepared according to the invention may be diluted with additional polyahl to obtain 40% solids material. The diluted copolymer polyahl will generally exhibit a lower viscosity than a copolymer polyahl prepared according to this invention having 40% solids prior to any dilution.

The resulting copolymer dispersion is readily reacted with an organic polyisocyanate to form desirable polyurethane products using conventional polyurethane reaction conditions and procedures. Such reaction and procedures are optionally carried out in the presence of additional polyahls, chain extending agents, catalysts, surface active agents, stabilizers, blowing agents, fillers and pigments. In the preparation of foamed polyurethane, suitable procedures for the preparation of same are disclosed in U.S. Pat No. Re. 24,514, which is incorporated herein by reference. When water is added as the blowing agent, corresponding quantities of excess isocyanate to react with the water and produce carbon dioxide may be used. It is also possible to prepare polyurethane plastics by a prepolymer technique wherein an excess of organic polyisocyanate is reacted in a first step with the graft copolymer dispersion of the present invention to prepare a prepolymer having free isocyanate groups which is then reacted in a second step with water to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride and methylene chloride may be used as blowing agents.

The foams may also be prepared by the froth technique as described in U.S. Pat. Nos. 3,755,212; 3,849,156 and 3,821,130 which are also incorporated herein by reference.

Organic polyisocyanates which may be employed include aromatic aliphatic and cycloaliphatic polyisocyanates and combinations thereof. Representative of these types are the diisocyanates such as m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxphenyl-2,4-diisocyanate, diphenylmethane-4,4-diisocyanate, 4,4'-biphenylene diisocyanate, 3,3'-dimethoxy-4,4'-biphenyl diisocyanate, 3,3'-dimethyl-4,4'-diphenyl diisocyanate, and 3,3'-dimethyldiphenypropane-4,4',4'-diisocyanate; the triisocyante polymethylene polyphenylisocyante and tolylene-2,4,6-triisocyanate; and the tetraisocyanates such as 4,4'-dimethyldiphenylmethane-2,2',5,5'-tetraisocyanate. Expecially useful due to their availability and properties are tolylene diisocyanate, diphenylmethane-4,4'-diisocyanate and polymethylene polyphenylisocyanate.

Crude polyisocyanate may also be used in the practice of the present invention, such as crude toluene diisocyanate obtained by the phosgenation of a mixture of toluene diamines or crude diphenylmethylene diisocyanate obtained by the phosgenation of crude diphenylmethylenediamine. The preferred undistilled or crude isocyanates are disclosed in U.S. Pat. No. 3,215,652.

The copolymer dispersions of this invention are preferably employed in combination with other polyahl(s) commonly employed in the art. Accordingly, any of the polyahls which are described above for use in the preparation of the polymer dispersions of the present invention may be employed.

Chain extending agents which may be employed in the preparation of the polyurethane compositions of the present invention include relatively low equivalent weight compounds having at least two functional groups bearing active hydrogen atoms such as water, hydrazine, primary and secondary diamines, amino alcohols, amino acids, hydroxy acids, glycols or mixtures thereof. A preferred group of chain extending agents includes water and primary and secondary aromatic diamines which react more readily with the isocyanate than does water such phenylenediamine, bis(3-chloro-4-aminophenyl)methane, 2,4-diamino-3,5-diethyl toluene, trisecondary butanolamine, isopropanolamine, diisopropanolamine, N-(2-hydroxypropyl)ethylenediamine, and N,N'-di(2-hydroxypropyl)ethylenediamine.

The reaction of polyisocyanate with the copolymer polyahl is advantageously carried out in the presence of an amount of urethane-type catalyst which is effective to catalyze reaction of the polyahl of the copolymer dispersion with the polyisocyanate. Preferably, the amount of urethane catalyst is an amount comparable to that used in conventional urethane-type reactions.

Any suitable urethane catalyst may be used including tertiary amines, such as for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropyl amine, N,N-dimethyl-N',N'-methyl isopropyl propylenediamine, N,N-diethyl-3-diethylaminopropyl amine, dimethyl benzyl amine and the like. Other suitable catalysts are, for example, tin compounds such as stannous chloride, tin salts of carboxylic acids such as dibutyltin di-2-ethyl hexoate, as well as other organometallic compounds such as are disclosed in U.S. Pat. No. 2,846,408.

A wetting agent(s) or surface-active agent(s) is generally necessary for production of high grade polyurethane foam according to the present invention, since in the absence of same, the foams collapse or contain very large uneven cells. Numerous wetting agents have been found satisfactory. Nonionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred include polyethylene glycol ethers of long chain alcohols, tertiary amine or alkylolamine salts of long chain alkyl acid sulfate esters, alkyl sulfonic esters and alkyl arylsulfonic acids.

The following examples are given to illustrate the present invention and are not to be construed as limiting the scope thereof in any manner. All parts and percentages are by weight unless otherwise indicated.

EXAMPLE I

In this and following examples, Polyol A refers to a 3000 MW triol prepared by reacting a trifunctional initiator with a mixed ethylene oxide/propylene oxide feed. Polyol B is a 4600 MW triol prepared by reacting a trifunctional initiator with a mixed ethylene oxide/propylene oxide feed and then capping about 20% of the terminal hydroxyl groups with isocyanatoethyl methacrylate.

To a one gallon agitated vessel are added 143 grams of Polyol A and 181 grams Polyol B. This mixture is heated to 130° C. under a nitrogen atmosphere. Then, 826 grams of Polyol A, 27 grams of azobis (methyl butyronitrile), 1050 grams of styrene, 450 grams of acrylonitrile, 4.8 grams of iodine and 120 grams of Polyol B are added to the vessel over a period of one hour. Then, an additional 230 grams of Polyol A that has been mixed with 8 grams of the azo initiator are added over a period of 15–30 minutes. During these additions, the temperature in the vessel is maintained at 135±5° C. The resulting copolymer polyol is vacuum stripped for a period of 1 to 2 hours to remove the remaining unreacted monomers.

The product copolymer polyol contains 47% solids and has a Brookfield viscosity of 4680 cps @ 25° C. There is minimal agglomeration of the suspended copolymer particles seen on visual inspection.

In comparison, a similar copolymer polyol prepared in the absence of the iodine has a viscosity well in excess of 10,000 cps and is severely agglomerated.

EXAMPLE II

Copolymer polyol Sample Nos. A-G are prepared by adding 201 grams Polyol A and 276 grams Polyol B to a one gallon agitated vessel. This mixture is heated to 125° C. under a nitrogen atmosphere. To the heated mixture are added over a period of one hour a mixture of 924 grams styrene, 396 grams acrylonitrile, 3.3 grams of a reaction modifier as indicated in Table I, 327 grams of Polyol A and 337 grams of Polyol B. Starting at the same time, a mixture of 30 grams azobis (methylbutyronitrile) and 839 grams of Polyol A are added over a 76 minute period. During these additions, the temperature inside the reaction vessel is maintained at 130±5° C. The resulting copolymer polyol is vacuum stripped for one-two hours to remove residual monomer, and cooled to room temperature.

Comparative Sample No. I-C is prepared in like manner in the absence of any reaction modifier. The Brookfield viscosity at 25° C. of Sample Nos. A-G and Comparative Sample No. I-C are measured and are as reported in Table I following. None of the samples of this invention have more than slight agglomeration of the suspended copolymer particles. The comparative sample, however, is severely agglomerated.

TABLE I

| Sample No. | Reaction Modifier | % Solids (Calculated) | Viscosity (Cps) |
|---|---|---|---|
| A | $I_2$ | 40 | 4400 |
| B | IBr | 40 | 4840 |
| C | ICl | 40 | 3950 |
| D | $Br_2$ | 40 | 7940 |
| E | $ZrI_4$ | 40 | 4920 |
| F | $SbI_3$ | 40 | 4330 |
| G | $CsI_3$ | 40 | 6050 |
| I-C | None | 40 | 13,520 |

It is seen that the presence of the halogen, interhalogen or inorganic iodine releasing compound in all cases except Sample No. D causes the viscosity of the copolymer polymer below 6000 cps. A viscosity below 6000 cps using $Br_2$ as reaction modifier is readily achieved by slightly increasing the amount used.

What is claimed is:

1. In a process for preparing a polymer polyahl comprising polymerizing an ethylenically unsaturated monomer or mixtures thereof in a polyahl or polyahl mixture whereby a dispersion of polymer particles is prepared in a continuous polyahl phase, the improvement comprising conducting said polymerization in the presence of a halogen selected from chlorine, bromine and iodine, an interhalogen in which the atoms are selected from chlorine, bromine or iodine or an iodine-releasing inorganic compound, said halogen, interhalogen or iodine-releasing inorganic compound being present in an amount sufficient to provide improved stability to said copolymer polyahl.

2. The improved process of claim 1 wherein the polymerization is conducted in the presence of iodine.

3. The process of claim 1 wherein the polymerization is conducted in the presence of iodine chloride or iodine bromide.

4. The process of claim 1 wherein the polymerization is conducted in the presence of an iodine-releasing inorganic compound.

5. The process of claim 4 wherein the iodine releasing inorganic compound comprises $ZrI_4$, $SbI_3$, $PI_3$, $PI_5$ or $AsI_3$.

6. The process of claim 4 wherein the iodine-releasing inorganic compound is an iodine-containing organometal compound.

7. The improved process of claim 1 where the iodine or iodine-releasing inorganic compound is employed in an amount from about 0.1 to about 2 percent by weight of the ethylenically unsaturated monomer or mixture of monomers.

8. The improved process of claim 1 wherein the polyahl or polyahl mixture contains graft polymerization sites.

9. The improved process of claim 8 wherein the polyahl or polyahl mixture contains purposefully introduced ethylenic unsaturation.

10. The improved process of claim 9 wherein the polyahl or polyahl mixture comprises the reaction product of a polyahl and a difunctional compound having an additional polymerizable ethylenically unsaturated group and another functional group which reacts with a polyahl to form a bond between the difunctional compound and the polyahl.

11. The improved process of claim 10 wherein the difunctional compound is an ethylenically unsaturated carboxylic acid.

12. The improved process of claim 10 wherein the difunctional compound is an ethylenically unsaturated isocyanate.

13. The improved process of claim 12 wherein the difunctional compound is an isocyanatoalkylester of acrylic or methacrylic acid.

14. The improved process of claim 1 wherein said monomer comprises styrene, acrylonitrile, or mixtures thereof.

* * * * *